United States Patent

[11] 3,602,445

[72] Inventors Kazuyoshi Nagao;
 Akihiko Katsura, both of Yokohama, Japan
[21] Appl. No. 861,597
[22] Filed Sept. 29, 1969
[45] Patented Aug. 31, 1971
[73] Assignee American Optical Corporation
 Southbridge, Mass.

[54] APPARATUS FOR PRODUCING BUNDLES OF OPTICAL FIBER
 2 Claims, 4 Drawing Figs.
[52] U.S. Cl. .................................................... 242/18 R, 242/18 G
[51] Int. Cl. ..................................................... B65h 54/10
[50] Field of Search........................................... 242/18, 186, 43, 158; 65/2, 11, 11 W; 350/96 B

[56] References Cited
UNITED STATES PATENTS

| | | | |
|---|---|---|---|
| 3,229,925 | 1/1966 | Ballmer ........................ | 242/18 G |
| 3,248,063 | 4/1966 | Sheldon et al. ................ | 242/18 G |
| 3,506,208 | 4/1970 | Davy et al. .................... | 242/18 |

Primary Examiner—Stanley N. Gilreath
Attorneys—William C. Nealon, Noble S. Williams and Robert J. Bird ABSTRACT: Producing bundles of optical fiber by winding successive layers of the fiber in the same spiral direction on winding apparatus. The apparatus includes a main winding drum over which a second coaxially aligned hollow drum of larger diameter is moveable along the common axis of the drums. A motor-driven lead screw coupled to the hollow drum is actuable to move the hollow drum back and forth along the winding surface of the main drum from one end to the other thereof while both drums are rotated by a common drive shaft. With the hollow drum positioned at one end of the main drum, the fiber is wound from the opposite end of the main drum along its surface up to and onto the hollow drum. Without interruption of the winding process, the fiber is returned to the beginning of the winding surface of the main drum by moving the hollow drum up to the starting point of the first winding. The hollow drum is then retracted causing the fiber to engage the first fiber winding on the main drum and continue therealong in the same spiral direction. A guide roller moved back and forth parallel to the common axis of the drums controls the pitch of spiral winding.

PATENTED AUG 31 1971

3,602,445

INVENTORS
KAZUYOSHI NAGAO
AKIHIKO KATSURA

BY *Rodge D. Williams*

ATTORNEY

3,602,445

APPARATUS FOR PRODUCING BUNDLES OF OPTICAL FIBER

BACKGROUND OF THE INVENTION

1. Field Of The Invention

Fiber optics with particular reference to apparatus for producing bundles of optical fiber.

2. Description Of The Prior Art

In the production of bundles of optical fiber intended to be used as image-transmitting devices, there is the requirement that corresponding opposite ends of fibers in the bundle be arranged in identical geometric patterns so that images transmitted by such devices will be substantially geometrically identical to the images received thereby. While tedious hand packing and aligning operations are commonly used to form fiber optical image transfer devices, various techniques and apparatuses have been devised for expediting the packing and aligning operations. In addition to the use of fiber holding and aligning fixtures, jigs and the like, a prior art technique for forming image-conducting fiber bundles involves the winding of ribbons of fiber on a rotatable drum as shown and described in U.S. Pat. No. 3,033,731, for example. Therein a multiplicity of ribbons of one fiber thickness are formed and stacked one within another, secured together throughout a section of their length and cut across the secured section to form geometrically identical opposite end faces of the resulting fiber bundle.

In having to make and use a multiplicity of ribbons of only one fiber thickness and hand stack these ribbons with their spiral directions aligned parallel to each other in order to produce the geometrically identically patterned end faces of the resulting fiver optics, many tedious and time-consuming operations are not avoided.

The present invention, in its relationship to apparatus for making fiber optic bundles, avoids the heretofore troublesome and time-consuming multiplicity of operations involved in the manufacture of image-conducting bundles of optical fiber by making it possible to wind a complete multilayer bundle of fiber in one continuous operation with all convolutions of the fiber having the same spiral direction as is required for producing identically geometrically patterned opposite end faces by cutting across the bundle.

SUMMARY OF THE INVENTION

In producing image-transmitting optical fiber bundles, it is necessary to arrange the lengths of fiber in a manner such as is shown in FIG. 2 of the accompanying drawing wherein the fiber lengths are aligned parallel to each other as a result of winding the convolutions of fiber in the same spiral direction rather than in alternately opposite spiral directions as shown in FIG. 2a. The latter results from a prior art practice of winding successive layers of fiber back and forth across each other.

According to the present invention, optical image-transmitting bundles formed of layers of fiber convolutions all having the same spiral direction are produced in large quantities in an uninterrupted, high-speed operation from a continuous optical fiber. A main winding drum upon which the optical fiber bundles are wound is coaxially aligned with a second hollow drum moveable in an axial direction over the main drum. A motor-driven lead screw coupled to the hollow drum is used to move the hollow drum back and forth along the winding surface of the main drum from one end to the other thereof simultaneously with rotation of the two drums by a common drive shaft. The winding operations is initiated with the hollow drum positioned adjacent one end of the main drum whereupon the fiber is wound from the opposite end of the main drum along its winding surface up to and onto the hollow drum. Without interruption of the winding process, the fiber is then returned to the beginning of the winding surface of the main drum for the winding of a second layer of fiber directly upon the first winding by moving the hollow drum, now carrying the fiber, over the main drum up to the starting point of the first winding. The hollow drum is then retracted, causing the fiber to engage the first wound layer thereof on the main drum and continue winding therealong. This operation is repeated without interruption until a desired number of layers of fiber is produced on the main drum. A guide roller moved back and forth parallel to the common axis of the two drums controls the direction and pitch of spiral winding.

In view of the fact that successive layers of fiber windings increase the effective winding diameter of the drum and normally correspondingly increase the tension on the fiber being wound with the result of the fiber diameter being reduced by stretching should it be supplied to the winding apparatus directly from a heated source of core and cladding materials, it is contemplated that cushions be provided in the winding surface of the main drum over which the fiber bundle is wound. By such means, variations in tension and thinning of the fiber or the effect of excessive tightening of fiber convolutions of successive layers thereof is avoided.

DESCRIPTION OF THE PREFERRED EMBODIMENTS

Figure 1:
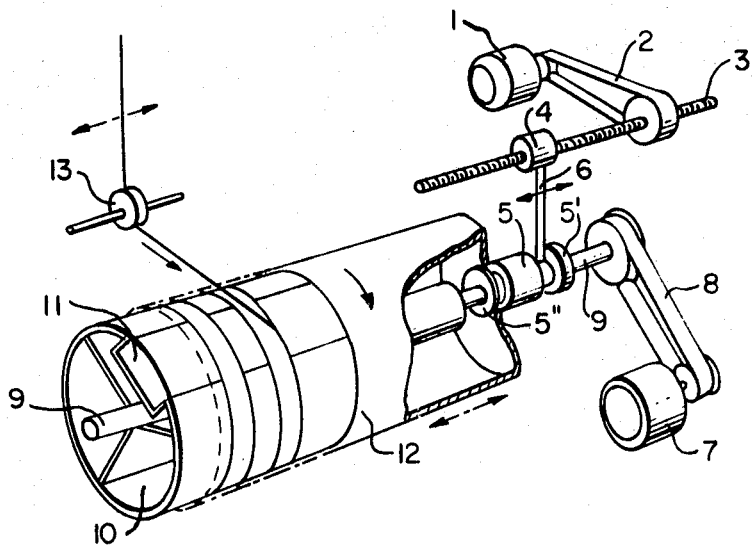
FIG. 1 is a diagrammatic illustration, in perspective, of a preferred embodiment of optical fiber winding apparatus.

In referring more particularly to FIG. 1 it will be seen that the illustrated optical fiber winding apparatus includes a lead screw 3 driven by a reversible motor 1 through belt 2. Screw 3 is selectively rotatable about its axis in opposite directions by motor 1. Internally threaded carriage 4 on lead screw 3 shifts the positions of sleeves 5, 5' and 5'' along shaft 9 through connecting members 6 when lead screw 3 is rotated. Sleeves 5, 5' and 5'' are moveable freely along shaft 9 but are keyed to rotate with shaft 9 whereby rotation of the shaft rotates both winding drums 10 and 12 in the same direction. Shaft 9 and drums 10 and 12 are rotated at constant speed by drive motor 7 through belt 8. A removable section 11 of the winding surface of drum 10 facilitates removal of bundles of fibers formed upon drum 10.

A roller 13 guides the fiber along winding drum 10 in a desired spiral winding direction and pitch for producing closely packed convolutions of the fiber along the winding surface of drum 10.

Figure 2:
FIG. 2 is a fragmentary perspective illustration of the type of optical fiber alignment obtained by use of the apparatus illustrated in FIG. 1.
Figure 2A:
FIG. 2a is a fragmentary perspective illustration of the type of optical fiber alignment resulting from the practice of a prior art multiple layer winding technique.

With drum 12 positioned adjacent one end of drum 10 as illustrated by full lines in FIG. 1, a winding of optical fiber guided by roller 13 either in the form of a closely packed continuous spiral or in the form of a plurality of spaced bands as shown in FIG. 1 is formed along drum 10 up to and onto drum 12. Thereupon without interruption of the winding procedure and while the fiber is temporarily on drum 12 this drum is moved by actuation of lead screw 3 along drum 10 over the fiber winding thereon to the position shown by dot-dash lines in FIG. 1. As this is taking place, guide roller 13 is moved back to the starting position at which the first layer of fiber was wound on drum 10 and drum 12 is retracted causing a second layer of fiber to be wound upon the first-mentioned layer thereof in the same spiral direction as that of the first layer. Upon completion of the winding of the second layer, the above-described winding operation is repeated a number of times sufficient to produce a desired thickness of windings on drum 10, all of which have the same spiral direction and preferably the same pitch. In this way, prior art alternately oppositely directed helix angles of fiber windings such as are illustrated in FIG. 2a are avoided.

The windings produced on drum 10 are cemented or otherwise secured together throughout a transverse section thereof, removed from the drum and cut transaxially through the secured section to form image-conducting bundles of fiber having identically geometrically patterned opposite end faces. Removal of section 11 from drum 10 facilitates the removal of fiber windings from the drum. It is also contemplated that a sheet of thin plastic material may be wrapped around drum 10 and the fiber windings formed thereover to further facilitate removal of the fiber windings from the drum by sliding the plastic wrap off the drum with the fiber windings carried along with it.

Figure 3:
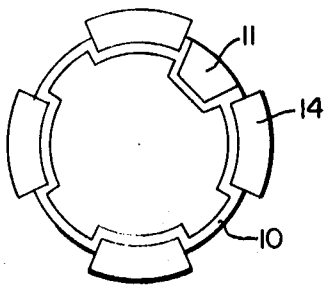
FIG. 3 is a diagrammatic illustration of a modification of the apparatus illustrated in FIG. 1.

In order to avoid undue increases in tension upon the fiber being wound as the effective winding diameter of drum 10 increases according to the number of layers of fiber being wound thereupon, resilient rubber cushions or air pillows 14 may be placed about the circumference of the winding surface of drum 10 as diagrammatically illustrated in FIG. 3. In so doing, the aforesaid increase in tension upon the fiber will be essentially negated by compression by the cushions in response to forces exerted thereagainst by the fiber when these forces exceed those produced during the winding of the first fiber layer on drum 10.

It is pointed out that cushions 14, FIG. 3, may be designed to have a nonlinear spring constant for producing the above-described result of their use or, in the case of their being air pillows or the like, automatic external control of air pressure therewithin may be provided to produce a desired nonlinear compression constant. It is further pointed out that the present invention contemplates the use of winding drums 10 and 12 which are noncircular, e.g. polygonal.

We claim:

1. Optical fiber winding apparatus comprising:
 a main winding drum;
 a rotatable drive shaft upon which said main drum is mounted for rotation with the drive shaft about its axis;
 a second hollow winding drum mounted on said drive shaft coaxially with said main drum, said second drum being diametrically larger than said main drum for movement over said main drum along said drive shaft;
 a number of sleeves coupling said second drum to said drive shaft for rotation herewith, said sleeves being slideable along said drive shaft as a unit with said second drum;
 means for moving said sleeves and second drum back and forth along said drive shaft;
 means for rotating said drive shaft simultaneously with said sliding movement of said sleeves and hollow drum; and
 a guide roller about which an optical fiber may be directed for winding upon said main and second drums, said guide roller being moveable back and forth along the lengths of said drums in directions parallel to the lengths of said drums.

2. An optical fiber-winding apparatus according to claim 1 including cushions on said main drum over which said optical fiber may be directed for winding upon said main drum.